No. 729,405. PATENTED MAY 26, 1903.
O. F. PERSSON.
POWER TRANSMITTING DEVICE.
APPLICATION FILED APR. 12, 1902.
NO MODEL. 4 SHEETS—SHEET 1.

WITNESSES
Robt. A. Chapman.
Alex F. Macdonald.

INVENTOR
Otto F. Persson.
By Curtis Davis
Atty.

No. 729,405. PATENTED MAY 26, 1903.
O. F. PERSSON.
POWER TRANSMITTING DEVICE.
APPLICATION FILED APR. 12, 1902.
NO MODEL. 4 SHEETS—SHEET 2.
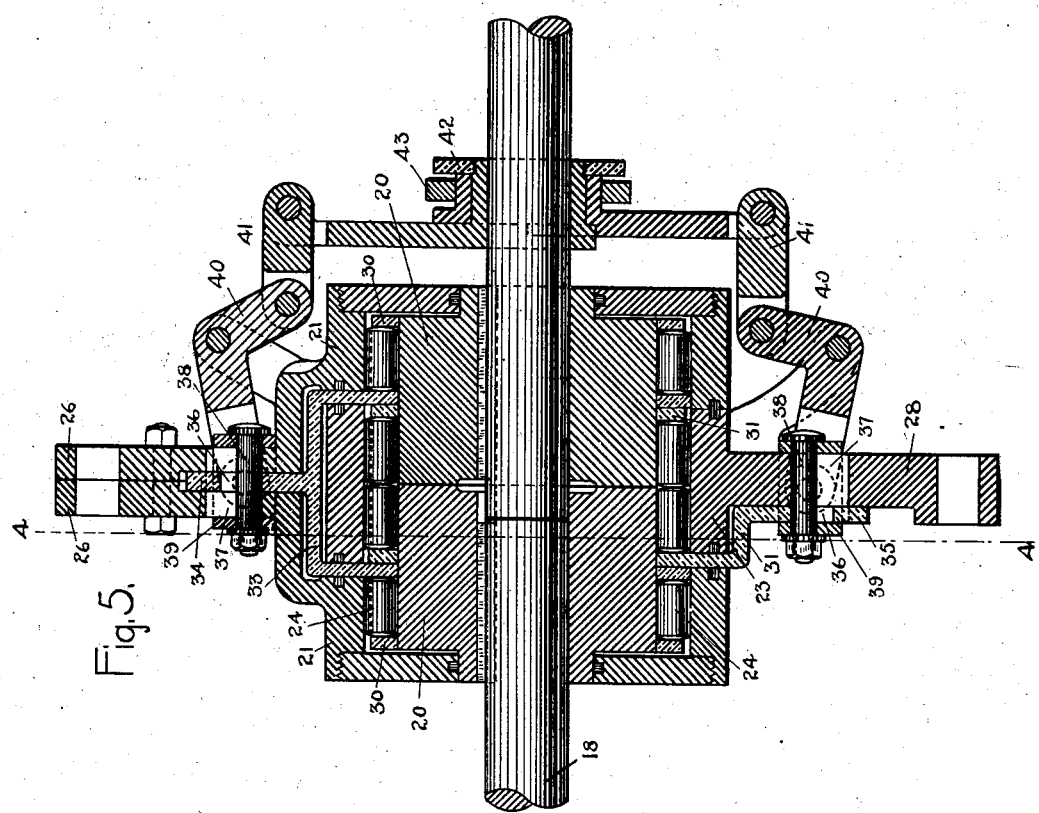
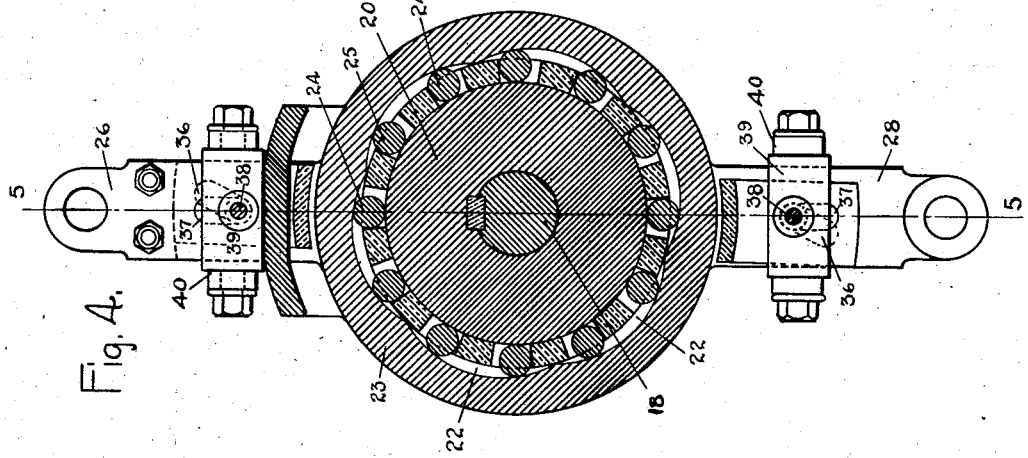
WITNESSES. INVENTOR
Otto F. Persson,
By Albert G. Davis
Atty.

No. 729,405. PATENTED MAY 26, 1903.
O. F. PERSSON.
POWER TRANSMITTING DEVICE.
APPLICATION FILED APR. 12, 1902.
NO MODEL. 4 SHEETS—SHEET 3.
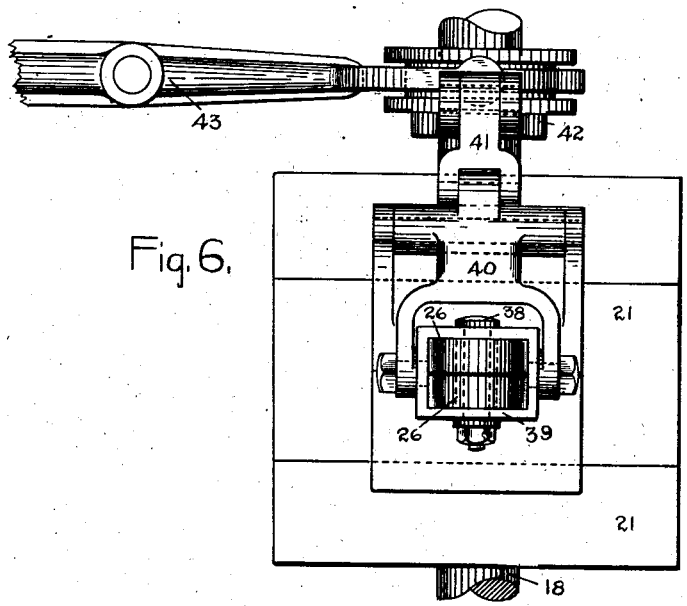
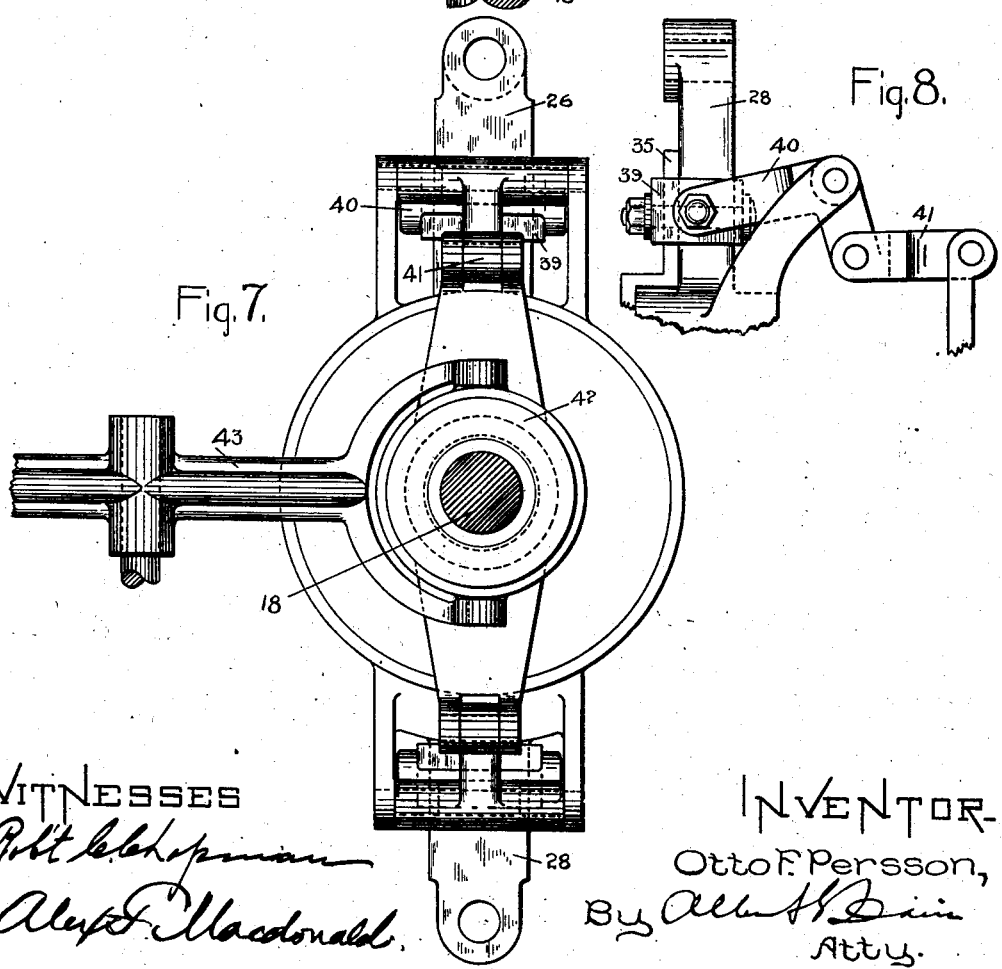
WITNESSES
INVENTOR
Otto F. Persson,
By Atty.

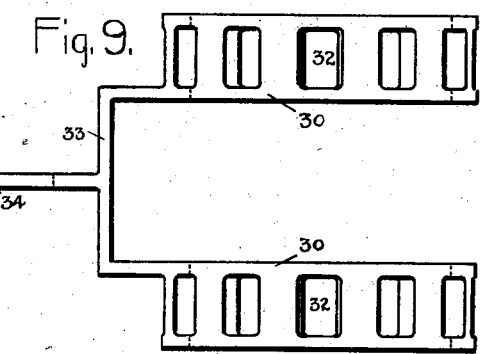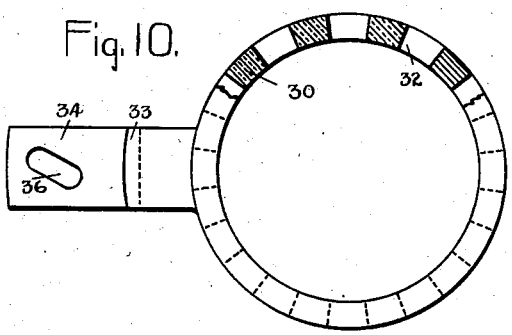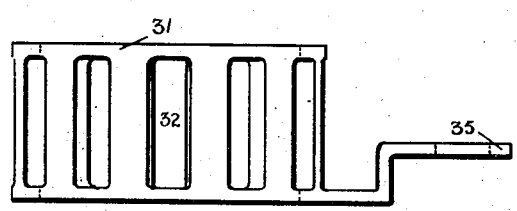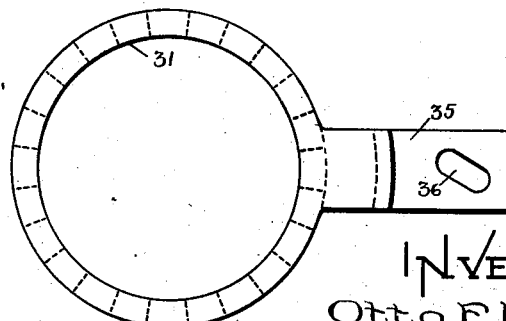

No. 729,405. Patented May 26, 1903.

UNITED STATES PATENT OFFICE.

OTTO F. PERSSON, OF LYNN, MASSACHUSETTS, ASSIGNOR TO ELIHU THOMSON, OF SWAMPSCOTT, MASSACHUSETTS.

POWER-TRANSMITTING DEVICE.

SPECIFICATION forming part of Letters Patent No. 729,405, dated May 26, 1903.

Application filed April 12, 1902. Serial No. 102,628. (No model.)

*To all whom it may concern:*

Be it known that I, OTTO F. PERSSON, a citizen of the United States, residing at Lynn, county of Essex, State of Massachusetts, have invented certain new and useful Improvements in Power-Transmitting Devices, of which the following is a specification.

This invention relates to means for transmitting power from one revolving shaft to another, where it is desirable to let the driving-shaft rotate at a constant speed, while the speed of the driven shaft varies from zero to full speed, and either forward or backward, as may be. Such a device is especially valuable in automobiles, and I shall hereinafter describe my invention in that connection, although it is evidently available for other purposes.

With certain classes of work, notably automobiles propelled by steam or explosive engines, it is desirable to have variable-speed gearing between the engine and the driving wheel or wheels which is capable of driving the vehicle forward or backward. In addition to this when two wheels are used as drivers it is necessary to provide some sort of a differential system, whereby one wheel can move at a greater angular velocity than the other to compensate for deflections of the vehicle from a straight line.

The invention comprises a motor, preferably an explosive-gas engine running at a constant speed, a reciprocating slide driven by said motor, a device whereby the stroke of said slide can be varied from zero to full stroke, two rachet-and-pawl devices on the driven shaft connected with said slide, and means for reversing the pawls so as to reverse the direction of rotation of said shaft.

My invention resides especially in the construction of the ratchet-and-pawl device.

Figure 1:
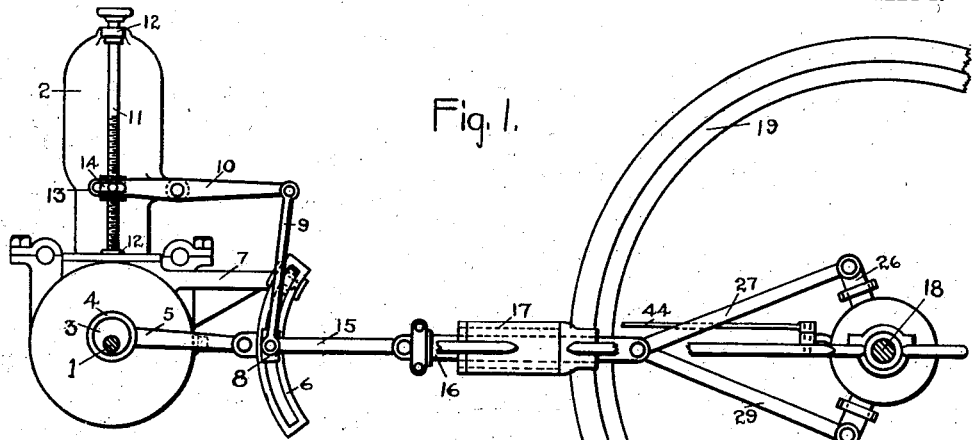
Figure 2:
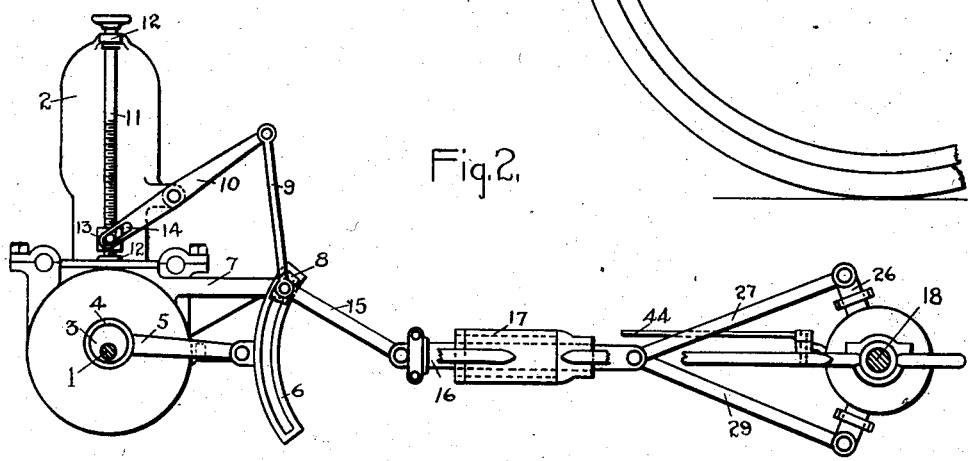
Figure 3:
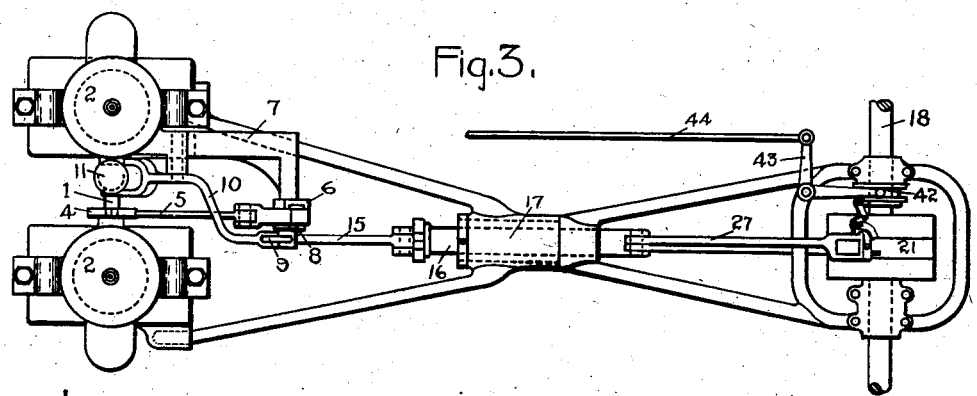

In the accompanying drawings, Figure 1 is a side elevation of one form of power-transmitting mechanism when driving at half-speed. Fig. 2 is a similar view with the driving-ratchets at rest. Fig. 3 is a top plan view. Fig. 4 is a cross-section of the ratchet-and-pawl device, on a larger scale, on the line 4 4, Fig. 5. Fig. 5 is a longitudinal section of the same on the line 5 5, Fig. 4. Fig. 6 is a top plan view of the same. Fig. 7 is an end view of the same. Fig. 8 is a detail elevation of a portion of the same. Fig. 9 is an elevation of one of the pawl-controllers. Fig. 10 is an end view of the same. Fig. 11 is an elevation of the other pawl-controller. Fig. 12 is an end view of the same.

For producing a variable movement of reciprocation I prefer to use the mechanism shown in Figs. 1, 2, and 3, where the power-shaft 1 is driven by one or more explosive gas-engines 2 and carries an eccentric 3, whose strap 4 is connected by a rod 5 with the curved link 6, pivotally suspended at one end from a stationary support, such as a bracket 7, projecting from the engine-casing. In the link is a link-block 8, connected by a hanger 9 with a rocker 10, which can be oscillated by any suitable means, such as a screw 11, turning in bearings 12 and meshing with a nut 13, pivotally mounted in slots 14 in one end of said rocker. By turning the screw the link-block can be set at any point along the link and will receive a corresponding range of angular movement around the pivot of the link as the latter is oscillated by the eccentric.

A rod 15 is pivoted to the link-block and also to a slide 16, which works in a guide 17 and receives a reciprocating movement from the eccentric through the link, link-block, and rod. The length of the stroke of this slide will vary from zero when the link-block coincides with the pivotal axis of the link, as in Fig. 2, to full stroke, when the link-block is at the lower end of the link.

To communicate the motion of the slide to the axle 18, there is mounted on said axle my improved ratchet-and-pawl device, connected with the slide. In order to provide for the different angular velocities of the driving-wheels on said axle, the latter is cut in two, each part carrying one wheel 19. On each part is mounted a separate driving device, the two being brought close together for convenience in operating.

The preferred form of ratchet-and-pawl device is shown in Figs. 4 to 12, inclusive. Secured to each part of the axle is a cylindrical disk 20, and concentric with each disk is a sleeve 21, having on its inner surface a plurality of evenly-spaced shallow recesses 22, whose ends form cam-surfaces. Between these two end sleeves 21 is a third sleeve 23, extending over the adjacent ends of both disks 20 and provided with cam-surfaces like those in the other sleeves. In each recess 22 of the sleeves 21 is a pair of steel rolls 24 25, bearing on the periphery of the disk 20, while in the sleeve 23 each recess has two pairs of similar rolls, one pair bearing on one disk and the other pair on the other disk.

The sleeves 21 each have at one side an arm 26, and the two arms are brought together and pivotally connected with a connecting-rod 27, pivoted to the slide 16. The two sleeves 21 thus operate as one and constitute a single actuator. The sleeve 23 also has an arm 28, similarly connected by a rod 29 with the slide 16, thereby forming another actuator. The reciprocating movements of the slide impart oscillating movements to the actuator, the sleeve 23 moving in the opposite direction to the sleeves 21. The cam-surfaces at the ends of the recesses 22 cause the rolls to grip the peripheries of the disks and compel them and the two parts of the axle to turn with the actuators.

As there are two rolls in each recess, one grips at one end and the other at the other end thereof, each being loose and inoperative when the other grips. If no means were provided for determining which roll of each pair should be operative at any given time, the two actuators 21 and 23 moving in opposite directions would act against each other. I therefore arrange two pawl-controllers, one for each actuator, whereby either set of rolls can be kept from gripping, and thus the actuators will operate alternately to rotate the axle. The pawl-controllers consist of rings 30 31, located in the annular spaces between the sleeves and the disks and containing lengthwise slots 32, in which the rolls are received. The slots are slightly wider than the rolls, so that the latter have a certain amount of play. The rings 30 are connected by a yoke 33, on which is an arm 34, extending radially between the arms 26. The ring 31 has a similar arm 35 lying alongside the arm 28. In each arm 34 35 is a slot 36, which diagonally crosses a slot 37 in the arms 26 28. A pin 38 passes through each pair of slots, so that by moving the pin radially away from or toward the axle the rings 30 31 will be simultaneously shifted angularly with reference to the actuators. This shifting of the rings carries one roll in each pair against the cam-surface at that end of its recess and moves the other roll into the higher central portion of the recess, where it is inoperative. By thus shifting the pawl-controllers one way or the other it is possible to determine which set of rolls will grip, and therefore which way the axle will be rotated.

To effect the radial movement of the pins 38, each of them is mounted in a carrier 39, pivotally mounted in the forked end of a bifurcated bell-crank lever 40, whose other end is connected by a link 41 with a collar 42, sliding lengthwise of the axle and operated by a forked lever 43 and rod 44.

When the pins 38 are both moved inwardly toward the axle, as shown in Figs. 4 and 5, the pawl-controllers throw the rolls 24 into operation, so that upon each forward movement of the arms 26 (to the left in Fig. 4) and the alternate backward movement of the arm 28 (to the right) the cam-surface at the rear end of each recess 22 will cause each roll 24 to grip the disks 20 and turn them forward. This position of the pawl-controllers will be effected by a forward pull on the rod 44. To reverse the automobile, the rod 44 is pushed back, carrying the pins 38 to the outer ends of the slots 36 37 and throwing the rolls 24 out of operation and the rolls 25 into position to be acted upon by the cam-surfaces of the recesses 22, whereby a backward rotation is imparted to the axle.

It will be seen that at each forward oscillation of the arm 26 the end sleeves grip both disks and turn them, while on the backward oscillation of the arm 28 the middle sleeve grips both disks and turns them in the same direction as before. Thus a continuous movement of rotation is imparted to both parts of the shaft. If the automobile is turning a corner, so that part of the shaft carrying the inner wheel tends to rotate slower than the other, the driving will be done wholly by the inner wheel, the disk on the other part of the shaft running ahead of the actuating-sleeve. It will thus be seen that by means of the screw 11 the speed of the axle can be varied from zero up to full speed, while by means of the rod 44 the direction of rotation can be governed, the engine running constantly at a regular speed. This arrangement of power-transmitting devices is thus very advantageous for explosive-gas-engine automobiles, since this type of motor is most efficient when running at a predetermined speed and will not permit of any overload.

In the preceding description and in the drawings the friction gripping devices are described and shown as rolls; but it should be understood that the word "roll" and the illustration thereof are intended to cover, broadly, not only the cylindrical body shown, but also a spherical ball or a disk or any other equivalent thereof.

What I claim as new, and desire to secure by Letters Patent of the United States, is—

1. Means for converting a reciprocating motion into a movement of continuous rotation in either direction, consisting of a disk rotatably mounted, two sleeves concentric with said disk and provided with internal recesses having a cam-surface at each end, two rolls in each recess, means for positively holding either one of said rolls inoperative, and means for oscillating said sleeves in opposite directions simultaneously.

2. Means for converting a reciprocating motion into a movement of continuous rotation in either direction, consisting of the combination with two abutting shafts, of a disk secured to each, two sleeves each concentric with its respective disk and movable in unison, a third sleeve between the other two and overlapping both disks, said sleeves all having internal recesses provided with a cam-surface at each end, two rolls in each recess of the end sleeves, and two pairs of rolls in each recess of the intermediate sleeve, rings controlling said rolls, means for simultaneously shifting said rings, and means for simultaneously oscillating the sleeves.

3. The combination with a shaft, of a disk secured thereon, a sleeve concentric with said disk and having internal recesses provided with a cam-surface at each end, two rolls in each recess, a ring between the disk and sleeve having a slot for each roll, an arm on the sleeve, an arm on the ring, and means for angularly shifting the relative positions of said arms.

4. The combination with a shaft, of a disk secured thereon, a sleeve concentric with said disk and having internal recesses provided with a cam-surface at each end, two rolls in each recess, a ring between the disk and sleeve having a slot for each roll, an arm on the sleeve having a slot, an arm on the ring having a slot diagonal to the slot in the sleeve-arm, a pin passing through both slots, and means for controlling the movements of the pin.

5. The combination with a shaft, of a disk secured thereon, a sleeve concentric with said disk and having internal recesses provided with a cam-surface at each end, two rolls in each recess, a ring between the disk and sleeve having a slot for each roll, an arm on the sleeve having a slot, an arm on the ring having a slot diagonal to the slot in the sleeve-arm, a pin passing through both slots, a carrier for the pin, and means for moving said carrier.

In witness whereof I have hereunto set my hand this 9th day of April, 1902.

OTTO F. PERSSON.

Witnesses:
 DUGALD McK. McKILLOP,
 JOHN A. McMANUS.